US009170462B2

(12) United States Patent
Guo et al.

(10) Patent No.: US 9,170,462 B2
(45) Date of Patent: Oct. 27, 2015

(54) ARRAY SUBSTRATE AND LIQUID CRYSTAL DISPLAY PANEL

(75) Inventors: Jian Guo, Beijing (CN); Weifeng Zhou, Beijing (CN); Xing Ming, Beijing (CN); Hao Wu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 79 days.

(21) Appl. No.: 13/270,866

(22) Filed: Oct. 11, 2011

(65) Prior Publication Data

US 2012/0092597 A1    Apr. 19, 2012

(30) Foreign Application Priority Data

Oct. 15, 2010    (CN) .......................... 2010 2 0574596

(51) Int. Cl.
     *G02F 1/1362*      (2006.01)

(52) U.S. Cl.
     CPC ............... *G02F 1/136259* (2013.01); *G02F 2001/136263* (2013.01)

(58) Field of Classification Search
     CPC .............. G02F 2001/136263; G02F 1/136259
     USPC ......................................................... 349/192
     See application file for complete search history.

(56) References Cited

U.S. PATENT DOCUMENTS

| 7,724,314 B2* | 5/2010 | Tanaka et al. ............... 349/54 |
| 8,325,288 B2* | 12/2012 | Chiu et al. ................. 349/54 |
| 2005/0078235 A1* | 4/2005 | Ozaki et al. .............. 349/55 |

* cited by examiner

*Primary Examiner* — Richard Kim
*Assistant Examiner* — Kendrick Hsu
(74) *Attorney, Agent, or Firm* — Ladas & Parry LLP

(57) ABSTRACT

An array substrate comprises a first metal layer in which first signal lines are disposed; a second metal layer in which second signal lines are disposed; an insulation layer provided between the first and second metal layers. A repairing line is provided in edge regions of the second metal layer and insulated from the second signal lines, and the repairing line comprises a first longitudinal portion, a second longitudinal portion and a transverse portion, the first longitudinal portion is electrically connected to the second longitudinal portion by the transverse portion. A projection of the first longitudinal portion in a plane of the first metal layer intersects with one end of each of the first signal lines, and a projection of the second longitudinal portion in the plane of the first metal layer intersects with the other end of each of the first signal lines.

8 Claims, 3 Drawing Sheets

ARRAY SUBSTRATE AND LIQUID CRYSTAL DISPLAY PANEL

BACKGROUND

Embodiments of the disclosed technology relate to an array substrate and a liquid crystal display panel.

Thin film transistor liquid crystal displays (TFT-LCDs) have the advantages of small volume, low power consumption, no radiation, and etc., and thus have prevailed in the current flat panel display market.

A TFT-LCD is formed by assembling together an array substrate and a color filter substrate with liquid crystal layer injected therebetween. As shown in FIG. 1, in a conventional technology, the array substrate comprises a first metal layer and a second metal layer, and an insulation layer (not shown in FIG. 1) is disposed between the first metal layer and the second metal layer, gate lines 11 are formed along a transverse direction in the first metal layer and data lines 12 are formed along a longitudinal direction in the second metal layer. The gate lines 11 and the data lines 12 are crossed each other to define a plurality of pixel regions 13, and a pixel electrode and a TFT are formed in each of the plurality of the pixel regions 13. By taking one of the plurality of the pixel regions 13 as an example, when the TFT-LCD operates, a driving signal is applied to the gate line 11 to control turning-on and turning-off of the TFT, and an image data signal is applied to the data line 12 and further to the pixel electrode via the data line. The liquid crystal molecules in the TFT-LCD are deflected under the control of the voltage difference between the pixel electrodes supplied with the image data signals and the common electrodes so as to control the light transmission, and under the cooperation with the color filter substrate, a desired image is displayed.

During the manufacturing processes of the array substrate, defects, such as disconnection, may occur in the gate lines due to a process deviation and the like. In a conventional technology, after the gate lines are formed by means of an etching process, an electrical detection is performed on the gate lines to detect out a disconnection position of the gate lines, then a repairing process is performed. Then, steps for depositing an insulation layer, forming the data lines and the like are performed to complete the final array substrate. However, after the insulation layer is deposited on the gate lines or in the final array substrate, because the gate lines is covered with the insulation layer, only an electrical detection may be performed on the gate lines, and if a disconnection defect is found in the gate lines, it is impossible to repair the bad gate lines so that the array substrate may become useless or deserted or a bad display of an image may occur in the liquid crystal display.

SUMMARY

An embodiment of the disclosed technology provides an array substrate, comprising: a first metal layer; a second metal layer; an insulation layer provided between and for insulating the first metal layer and the second metal layer, wherein a plurality of first signal lines are disposed along a first direction in the first metal layer and a plurality of second signal lines are disposed along a second direction in the second metal layer, and a repairing line provided in edge regions of the second metal layer and insulated from the plurality of the second signal lines, wherein the repairing line comprises a first longitudinal portion, a second longitudinal portion and a transverse portion, the first longitudinal portion is electrically connected to the second longitudinal portion by the transverse portion, and wherein a projection of the first longitudinal portion in a plane of the first metal layer intersects with one end of each of the plurality of the first signal lines, and a projection of the second longitudinal portion in the plane of the first metal layer intersects with the other end of each of the plurality of the first signal lines.

Another embodiment of the disclosed technology also provides a liquid crystal display panel, comprising: a color filter substrate; and an array substrate according to an embodiment of the disclosed technology, which is disposed opposite to the color filter substrate; and a liquid crystal layer injected between the color filter substrate and the array substrate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

It should be understood that the embodiments described below are only a part of, not all of, the embodiments of the disclosed technology. Based on the described embodiments, any other embodiments accomplished by those skilled in the art without inventive works are fallen within the scope of the disclosed technology also.

Figure 1:
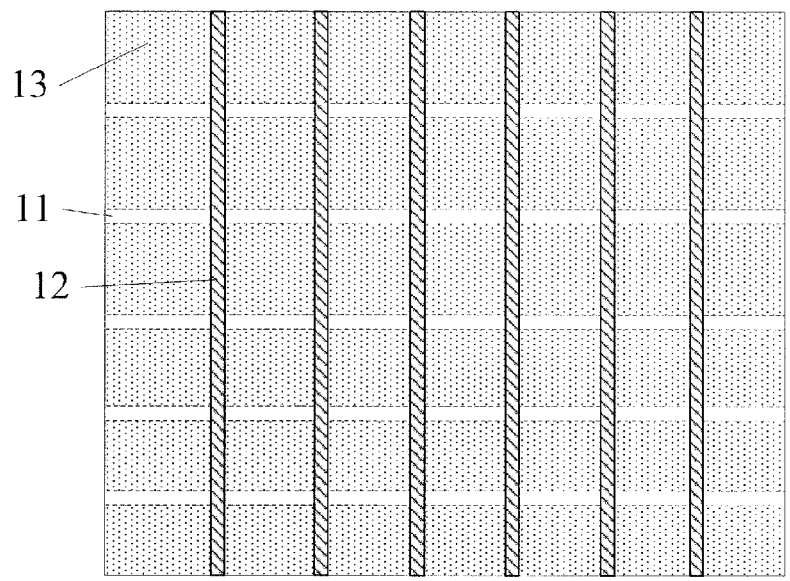
FIG. 1 is a schematic structural view of an array substrate in the prior art.
Figure 2:
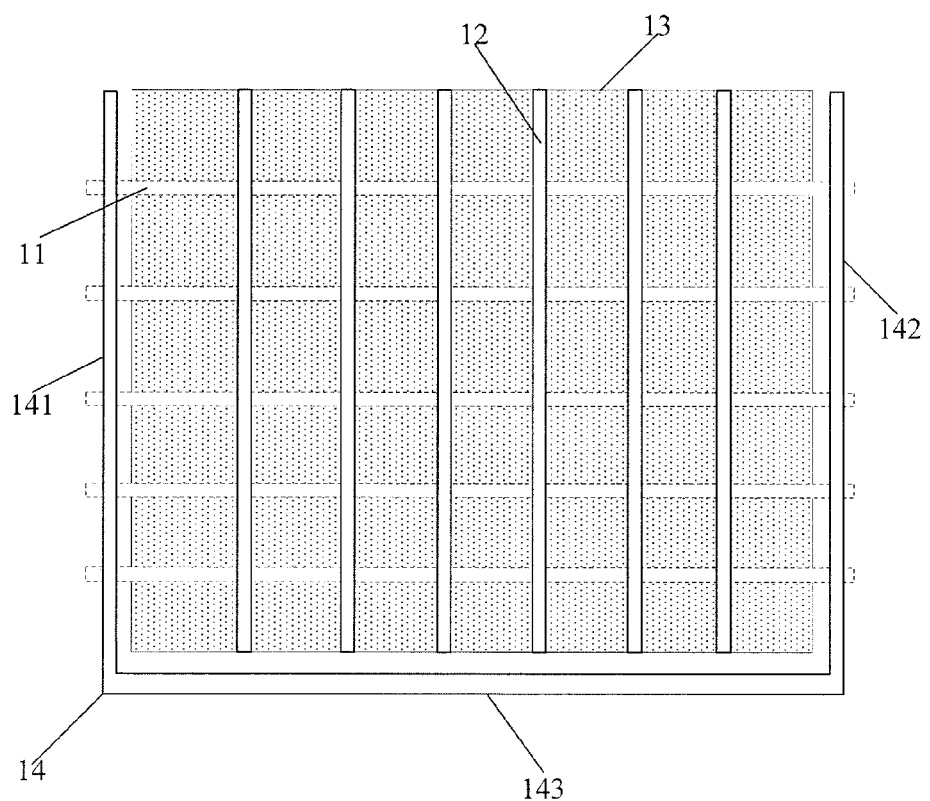
FIG. 2 is a schematic structural view of an array substrate according to an embodiment of the disclosed technology.

FIG. 2 is a schematic structural view for showing an array substrate according to a specific embodiment of the disclosed technology, and it is noted that FIG. 2 is only a simple view for emphasizing features of the array substrate of the present embodiment and thus, some parts are not shown in FIG. 2.

The array substrate according to the present embodiment comprises a first metal layer and a second metal layer, wherein an insulation layer (not shown in the drawing) is provided between the first metal layer and the second metal layer, gate lines 11 are disposed along a transverse direction in the first metal layer. and data lines 12 are disposed along a longitudinal direction in the second metal layer. The gate lines 11 and the data lines 12 are crossed each other to define a plurality of pixel regions 13, and a pixel electrode and a TFT (not shown in drawing) are provided in each of the plurality of the pixel regions 13.

As shown in FIG. 2, a repairing line 14 is further disposed in the second metal layer, that is, in the same layer as the data lines 12. The repairing line 14 is disposed in edge regions (or peripheral regions around the array substrate) of the second metal layer of the array substrate, insulated from all of the data lines 12 and is not electrically connected to the pixel electrodes, the TFTs and any other structures of the pixel regions 13.

The repairing line 14 comprises a first longitudinal portion 141, a second longitudinal portion 142 and a transverse portion 143, wherein the first longitudinal portion 141 and the second longitudinal portion 142 are connected to each other with the transverse portion 143. A projection of the first longitudinal portion 141 in a plane of the first metal layer intersects with one end of each of the gate lines 11, a projection of the second longitudinal portion 142 in the plane of the first metal layer intersects with the other end of each of the gate lines 11, that is, the first longitudinal portion 141 and the second longitudinal portion 142 spatially intersect with the gate lines 11. More specifically, the first and second longitudinal portions 141 and 142 and the gate lines 11 are positioned to cross to each other in the different metal layers, and the first longitudinal portion 141 and the second longitudinal portion 142 can be electrically connected to the gate lines 11 by using a conductive path passing through the insulation layer between the first metal layer and the second metal layer.

When a disconnection defect does not occur in each of the gate lines 11, the repairing line 14 does not operate because the repairing line 14 is positioned in edge regions of the second metal layer and is not electrically connected with the data lines 12, the pixel electrodes and the TFTs in the array substrate.

However, when one of the gate lines 11 has a disconnection defect and need to be repaired, the first longitudinal portion 141 can be electrically connected to one end of the disconnected gate line 11 by using a conductive path passing through the insulation layer between the first metal layer and the second metal layer, and at the same time, the second longitudinal portion 142 can be electrically connected to the other end of the disconnected gate line 11 by using a conductive path passing through the insulation layer between the first metal layer and the second metal layer, that is, the first longitudinal portion 141 and the second longitudinal portion 142 are electrically connected to two ends of the disconnected gate line 11, respectively, and thus, because the first longitudinal portion 141 and the second longitudinal portion 142 are electrically connected to each other by the transverse portion 143, the two ends of the disconnected gate line 11 are electrically connected to each other again by the repairing line 14, so that the disconnection can be repaired.

Meanwhile, because the two ends of the disconnected gate line 11 are electrically connected to each other by the repairing line 14 after repairing and a line resistance may be slightly increased, the width of the repairing line 14 may be slightly larger than the width of the gate lines 11 in order to reduce the influence of the resistance on repairing and to minimize the influence of line resistance variation.

A punching-depositing process or a laser cutting process may be used as examples to electrically connect the first and second longitudinal portions 141 and 142 to the disconnected gate line 11.

More specifically, the process of the punching-deposing may comprises the following steps. Holes are punched at the spatial intersection points of the first and second longitudinal portions 141 and 142 with the disconnected gate line 11, and the holes pass through the insulation layer between the first metal layer and the second metal layer, and then a conductive material, such as, tungsten powers, is deposited into the holes, and thus, the first longitudinal portion 141 and the second longitudinal portion 142 are electrically connected to the two ends of the disconnected gate line 11, respectively.

The process of the laser cutting may comprise the following steps. Laser cutting is performed at the spatial intersection points of the first and second longitudinal portions 141 and 142 with the disconnected gate line 11, the metal materials at the spatial intersection points of the first and second longitudinal portions 141 and 142 with the disconnected gate line 11 are melted by laser illumination and the melted metal materials flow to the disconnected gate line through the insulation layer between the first metal layer and the second metal layer and then the melted metal materials solidifies, and thus, the first longitudinal portion 141 and the second longitudinal portion 142 are electrically connected to the two ends of the disconnected gate line 11, respectively.

In the present embodiment, only one repairing line 14 is showed for repairing one disconnected gate line 11. However, the disclosed technology is not limited to this, a plurality of repairing lines 14 arranged in parallel may be included, that is, the array substrate may comprises a plurality of repairing lines to repair a plurality of disconnected gate lines 11.

Figure 3:
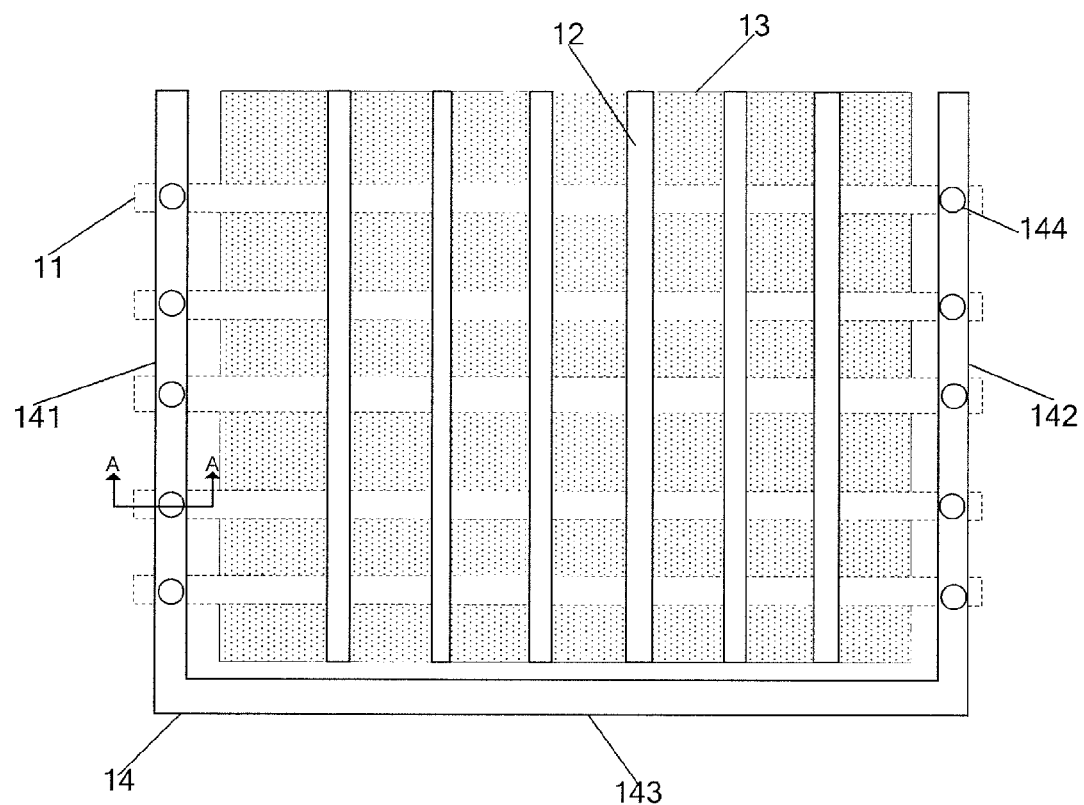
FIG. 3 is a schematic structural view of an array substrate according to another embodiment of the disclosed technology.
Figure 4:
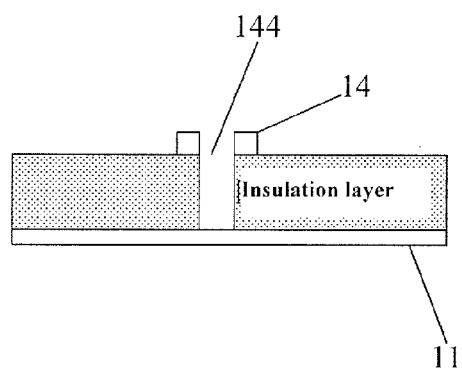
FIG. 4 is a cross-sectional view taken along AA direction of the array substrate shown in FIG. 3.

As an improvement of the embodiment of the disclosed technology, a through hole 144 is disposed at each of the spatial intersection points of the first and second longitudinal portions 141 and 142 with each of the disconnected gate line 11, and the through hole 144 passes through the insulation layer between the first metal layer and the second metal layer to extend to each of the gate line 11, as shown in FIGS. 3 and 4. When a certain gate line 11 become disconnected, a conductive material, such as tungsten powers, may directly be deposited into the through holes 144 at the spatial intersection points of the first longitudinal portion 141 and the second longitudinal portion 142 with the disconnected gate line 11 to electrically connect the first longitudinal portion 141 and the second longitudinal portion 142 to two ends of the disconnected gate line 11, respectively. In an example of the disclosed technology, there is a disconnected gate line among the gate lines 11, and a conductive material is deposited into the through holes 144 at the spatial intersection points of the first longitudinal portion 141 and the second longitudinal portion 142 with the disconnected gate line 11; thus the parts of the disconnected gate line are electrically connected again.

Figure 5:
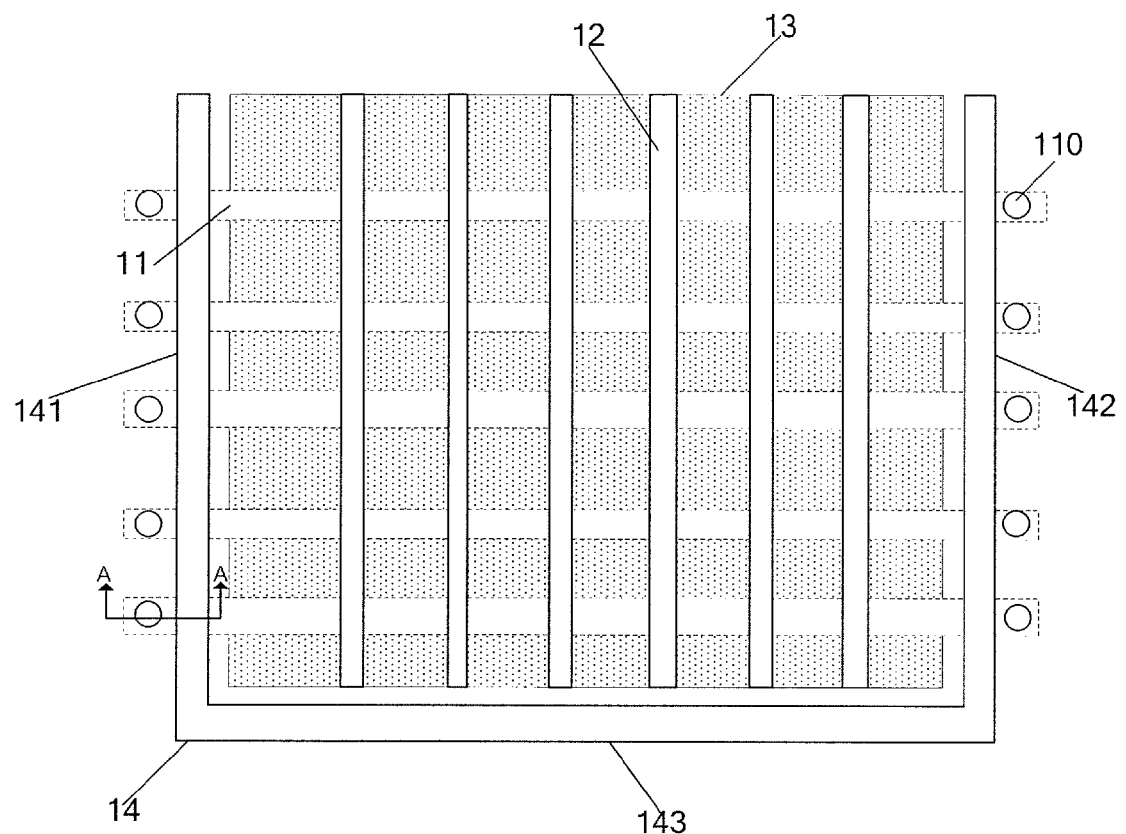
FIG. 5 is a schematic structural view of an array substrate according to another embodiment of the disclosed technology.
Figure 6:
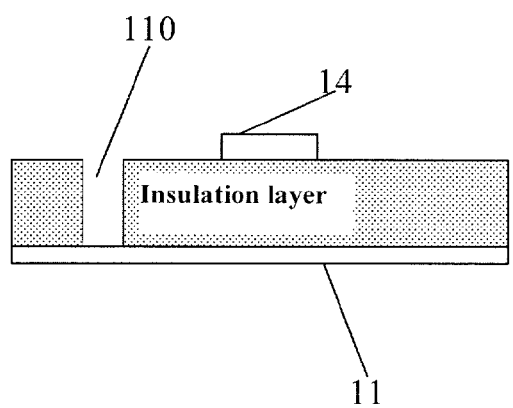
FIG. 6 is a cross-sectional view taken along AA direction of the array substrate shown in FIG. 5.

In addition, as another improvement of the present embodiment, a through hole may not be disposed at each of spatial intersection points of the first longitudinal portion 141 and the second longitudinal portion 142 with each of the gate lines 11, but as shown in FIGS. 5 and 6, one through hole 110 is disposed at each of two ends of each of the gate line 11 above the second metal layer, and the through hole 110 passes through the insulation layer between the first metal layer and the second metal layer and extends to each of the gate lines 11, and the through hole 110 is adjacent to the repairing line 14 but does not overlap with the data lines 12 and the pixel region 13. When one gate line 11 become disconnected, a conductive material, such as tungsten powers, may be deposited into two through holes 110 corresponding to two ends of the disconnected gate line 11, and the two through holes 110 filled with the conductive material are electrically connected to the first longitudinal portion 141 and the second longitudinal portion 142 by using a bridge connection, wire connection and the like, respectively, that is, the first longitudinal portion 141 and the second longitudinal portion 142 are electrically connected to the two ends of the disconnected gate line 11, respectively. In an example of the disclosed technology, there is a disconnected gate line among the gate lines 11, the conductive material is filled into the through holes 110 corresponding to two ends of the disconnected gate line above the second metal layer, respectively, and the through holes 110 filled with the conductive material are electrically connected to the first longitudinal portion 141 and the second longitudinal portion 142, respectively; thus the parts of the disconnected gate line are electrically connected again.

With the above mentioned structure, when one gate line of two adjacent gate lines disconnects and the other gate line normally operates, a conductive material may be filled into through holes 110 corresponding to two ends of the two adjacent gate lines, and the through holes positioned at the same ends of the two adjacent gate lines can be electrically connected to each other by using a bridge connection or wire connection, that is, the two ends of the adjacent gate lines may be electrically connected to each other, respectively. Thus, when the normal gate line 11 is applied with a voltage signal, the voltage signal is transmitted to the disconnected gate line 11 via the normal gate line 11. Because generally difference between adjacent two row pixels is small, the disconnected gate line can be repaired without disadvantageously affecting display. In an example of the disclosed technology, there is a disconnected gate line among the gate lines 11, a conductive material is filled into the through holes 110 positioned at two ends of the disconnected gate line above the second metal layer and a conductive material is also filled into the through holes 11 positioned at two ends of the gate line being adjacent to the disconnected gate line above the second metal layer, and the through holes positioned at the same ends of the disconnection gate line and the adjacent gate line are electrically connected to each other; thus the parts of the disconnected gate line are electrically connected again.

Further, an embodiment of the disclosed technology also provides a liquid crystal display panel, comprising a color filter substrate and an array substrate disposed opposite to the color filter substrate with a liquid crystal layer injected therebetween, wherein the array substrate is implemented as one of the embodiments of the disclosed technology, and the detail thereof is omitted.

With regard to the liquid crystal display panel according to the embodiment of the disclosed technology, when a disconnected gate line is detected out, a first longitudinal portion of a repairing line can be electrically connected to one end of the disconnected gate line and a second longitudinal portion of the repairing line can be electrically connected to the other end of the disconnected gate line, and because the first longitudinal portion and the second longitudinal portion is connected to each other by a transverse portion, the two ends of the disconnected gate line can be electrically connected to each other again via the repairing line so that the disconnection of the gate line is repaired.

The embodiment of the disclosed technology being thus described, it will be obvious that the same may be varied in many ways. Such variations are not to be regarded as a departure from the spirit and scope of the disclosed technology, and all such modifications as would be obvious to those skilled in the art are intended to be included within the scope of the following claims.

What is claimed is:

1. An array substrate, comprising;
a first metal layer;
a second metal layer;
an insulation layer provided between and for insulating the first metal layer and the second metal layer, wherein a plurality of first signal lines are disposed along a first direction in the first metal layer and a plurality of second signal lines are disposed along a second direction in the second metal layer, and
a repairing line provided in edge regions of the second metal layer and insulated from the plurality of the second signal lines, wherein the repairing line comprises a first longitudinal portion, a second longitudinal portion and a transverse portion, the first longitudinal portion is electrically connected to the second longitudinal portion by the transverse portion,
wherein a projection of the first longitudinal portion in a plane of the first metal layer intersects with one end of each of the plurality of the first signal lines, and a projection of the second longitudinal portion in the plane of the first metal layer intersects with the other end of each of the plurality of the first signal lines,
wherein a through hole is arranged in the insulation layer,
wherein there is a disconnected first signal line among the plurality of the first signal lines, a conductive material is filled into the through hole above the first metal layer at two ends of the disconnected first signal line, a conductive material is filled into the through hole above the first metal layer at two ends of another first signal line adjacent to the disconnected first signal line and the through hole at the two ends of one same side of two sides of the disconnected first signal line and the another first signal line adjacent to the disconnected first signal line are electrically connected to each other, and the through holes at the two ends of the other same side of the two sides of the disconnected first signal line and the another first signal line adjacent to the disconnected first signal line are electrically connected to each other,
the through hole at the two same ends of the same side of the two sides of the disconnected first signal line and the another first signal line adjacent to the disconnected first signal line are electrically connected to each other by using a bridge connection,
wherein the first signal lines are gate lines, and one row pixel driven by the disconnected first signal line and one row pixels driven by the another first signal line adjacent to the disconnected first signal line are applied with the same driven signal at the same time and are driven at the same time,
wherein the another first signal line which is configured to repair the disconnected first signal line is electrically connected to a gate of a thin film transistor of each of pixels driven by the another first signal line.

2. The array substrate according to claim 1, wherein a width of the repairing line is larger than a width of the first signal line.

3. The array substrate according to claim 1, wherein a plurality of the repairing lines are provided and arranged in parallel to each other in the edge regions.

4. A liquid crystal display panel, comprising:
a color filter substrate;
an array substrate according to claim 1, which is disposed opposite to the color filter substrate, and
a liquid crystal layer injected between the color filter substrate and the array substrate.

5. The array substrate according to claim 1, wherein the through hole is disposed at each of spatial intersection points of the first longitudinal portion and the second longitudinal portion with each of the plurality of the first signal lines, and the through hole passed through the insulation layer between the first metal layer and the second metal layer and extends to each of the plurality of the first signal lines.

6. The array substrate according to claim 5, wherein where there is a disconnected first signal line among the plurality of the first signal lines, a conductive material is filled into the through hole at the spatial intersection points of the first longitudinal portion and the second longitudinal portion with the disconnected first signal line.

7. The array substrate according to claim 1, wherein the through hole is disposed at each of two ends of each of the plurality of the first signal lines above the second metal layer, the through hole is adjacent to the repairing line and passes through the insulation layer between the first metal layer and the second metal layer to extend to each of the first signal lines, and the through hole is formed outside the second signal lines and pixel regions defined by the first signal lines and the second signal lines crossing to each other.

8. The array substrate according to claim 7, wherein where there is a disconnected first signal line among the plurality of the first signal lines, a conductive material is filled into the through hole above the second metal layer at two ends of the disconnected first signal line, the through hole filled with the conductive material are electrically connected to the first longitudinal portion and the second longitudinal portion, respectively.

* * * * *